(12) United States Patent
Fehring (10) Patent No.: US 9,151,346 B2
(45) Date of Patent: Oct. 6, 2015

(54) CENTRIFUGAL CLUTCH DRIVE SYSTEM

(71) Applicant: Thomas C. Fehring, Cincinnati, OH (US)

(72) Inventor: Thomas C. Fehring, Cincinnati, OH (US)

( * ) Notice: Subject to any disclaimer, the term of this patent is extended or adjusted under 35 U.S.C. 154(b) by 93 days.

(21) Appl. No.: 13/804,475

(22) Filed: Mar. 14, 2013

(65) Prior Publication Data

US 2014/0274518 A1     Sep. 18, 2014

(51) Int. Cl.
*F16D 13/60* (2006.01)
*F16D 43/18* (2006.01)
*F16D 43/10* (2006.01)

(52) U.S. Cl.
CPC ................ *F16D 43/18* (2013.01); *F16D 43/10* (2013.01)

(58) Field of Classification Search
CPC ................................. F16D 43/18; F16D 43/10
USPC .... 192/105 R, 105 C, 105 CS, 103 A, 110 R, 192/70.23, 70.24, 70.13, 93 A
See application file for complete search history.

(56) References Cited

U.S. PATENT DOCUMENTS

| | | | |
|---|---|---|---|
| 4,111,291 A | 9/1978 | Horstman | |
| 4,294,342 A | 10/1981 | St. John | |
| 4,732,251 A | 3/1988 | Tipton | |
| 4,856,637 A | 8/1989 | Gebhart | |
| 5,070,984 A | 12/1991 | Fehring | |
| 5,141,090 A * | 8/1992 | Trojan | 192/84.5 |
| 5,284,234 A | 2/1994 | Miglizzi | |
| 5,503,261 A | 4/1996 | Schultz | |
| 5,638,935 A | 6/1997 | Fehring | |
| 6,279,711 B1 * | 8/2001 | Fehring | 192/105 C |
| 6,535,056 B2 * | 3/2003 | Mizuno | 327/544 |
| 6,536,574 B2 | 3/2003 | Fehring | |
| 2008/0156609 A1 | 7/2008 | Barron et al. | |
| 2008/0296118 A1 * | 12/2008 | Lee et al. | 192/103 A |

* cited by examiner

*Primary Examiner* — David J Hlavka
(74) *Attorney, Agent, or Firm* — Wood, Herron & Evans, LLP (57) ABSTRACT

An apparatus for use with a centrifugal clutch having a drum with a threaded opening. The apparatus includes an output hub having first and second ends, where the first end has threads for engaging the threaded opening of the drum. The hub has a longitudinal axis. The apparatus also includes a sprocket associated with the second end of the hub where the sprocket has a sprocket plane generally perpendicular to the longitudinal axis of the hub. The apparatus includes a ball bearing assembly disposed in an interior surface of the hub where the ball bearing has a bearing plane substantially aligned with the sprocket plane. The apparatus also includes at least one retaining member disposed on one side of the ball bearing assembly to secure the ball bearing assembly along the interior surface of the hub.

7 Claims, 7 Drawing Sheets

CENTRIFUGAL CLUTCH DRIVE SYSTEM

FIELD OF THE INVENTION

This invention is directed to centrifugal clutch drive systems, and particularly an improved output drive mechanism.

BACKGROUND OF THE INVENTION

In competitive go-kart racing, the kart designer strives to transmit as much of the motor's propulsive power to the drive axle as possible by minimizing power losses between the engine's output drive shaft and the drive axle which turns the wheels. To minimize power loss, the designer seeks to eliminate or at least minimize friction, vibration, structural deflection, and the like in all the components between the output drive shaft of the motor and the drive axle. On racing go-karts, the primary component interacting with the output drive shaft is a centrifugal clutch drive system.

Centrifugal clutch drive systems are well known in the art. These clutches, sometimes known as frictional contact axial clutches, utilize mating frictional members to transfer torque from an input shaft (the motor's output drive shaft) to an output sprocket or gear. A chain or belt transmits the torque from the output sprocket or pulley to the drive axle which turns the wheels of the go-kart. In one configuration, torque is transferred by harnessing the effects of centrifugal force upon pivoted weights to generate axial movement and ultimately axial thrust. This axial thrust is applied upon an output frictional member which, by interacting with an input shaft frictional member, effectively transmits the input shaft torque to the output sprocket or pulley.

A typical centrifugal clutch drive system includes a clutch mechanism attached to the motor's output drive shaft. An output sprocket is attached to a housing which is rotatably mounted about the drive shaft of the motor so as to rotate independently of the drive shaft. When the drive shaft reaches a specific RPM, the clutch mechanism engages the housing, thereby spinning the sprocket to drive a chain or belt. Antifriction elements, such as needle roller bearings or bushings, are used to rotatably mount the sprocket about the drive shaft. By virtue of their design, needle roller bearings and bushings can accommodate small sprockets (numerically fewer teeth). Needle roller bearings and bushings, however, can resist only radial loads, not axial loads because they are free to float fore and aft in the axle direction.

Vibration and bending of the input shaft due to the asymmetric load of the chain can cause significant lateral displacement of the sprocket. The chain determines the axial position of the sprocket. Chains, however, do not have much lateral strength or stiffness. Consequently, they quickly wear out or stretch and waste energy if not properly aligned. The fore and aft axial displacement of the sprocket also causes accelerated wear between the drum and the discs in disc clutches or drum and shoes in rim clutches.

Needle roller bearings and bushings are relatively imprecise and allow the sprocket to wobble, thereby wasting the propulsive energy of the motor. Adding to the imprecision, the clutch manufacturer, not the bearing manufacturer, often machines the inner bearing race so as to size the race to fit upon the drive shaft of the motor. The clutch manufacturer, however, cannot machine the bearing race with as tight of tolerances as the bearing manufacturer. Thus, the machining of the inner race by the clutch manufacturer introduces unwanted play between the bearings and bushings and the drive shaft of the motor, leading the sprocket to wobble, causing energy loss.

Needle roller bearings are considered "open" in that they have no seals to prevent lubricant from flowing out and dirt from blowing in. The loss of lubricant and the influx of dirt cause rapid wearing of the needle roller bearings and increased friction, which wastes the propulsive energy of the motor. Light thrust washers or flanged bushings are sometimes used with needle roller bearings, but are typically applied in only one axial direction due to space limitations. Lubrication of these thrust washers is minimal or nonexistent. While thrust washers are intended to inhibit sprocket wobble, they are largely ineffective.

Unlike needle roller bearings and bushings, ball bearings can withstand both axial and radial loads. Some centrifugal clutches use ball bearings, but these are typically positioned between the drum and drive hub. In that position, the ball bearings are not easily accessible for maintenance or replacement. Often the ball bearing assembly is press fit into place making removal difficult and time consuming. Also, because these centrifugal clutches position the inner race of the ball bearings around the drive hub, the ball bearings are larger and heavier than necessary. Consequently, the large ball bearings limit the size (number of teeth) of the sprocket that can be used. In other words, with the large ball bearings, smaller sprockets (low number of teeth) cannot be used.

In some centrifugal clutches, the centerline of the bearing, whether it be a needle roller bearing or a ball bearing, is not aligned with the centerline of the chain engaging the sprocket. This misalignment causes an overturning moment on the bearing, thereby increasing the rolling resistance of the bearing. This wastes the propulsive energy of the motor.

What is needed, therefore, is a centrifugal clutch drive system that minimizes power losses between the motor and the drive axle.

SUMMARY OF THE INVENTION

In one embodiment, an apparatus for use with a centrifugal clutch has a drum with a threaded opening, includes an output hub having first and second ends. The first end has threads for engaging the threaded opening of the drum. The hub has a longitudinal axis. The apparatus includes a sprocket associated with the second end of the hub. The sprocket has a sprocket plane generally perpendicular to the longitudinal axis of the hub. The apparatus has a ball bearing assembly disposed in an interior surface of the hub. The ball bearing has a bearing plane substantially aligned with the sprocket plane. The apparatus includes at least one retaining member disposed on one side of the ball bearing assembly to secure the ball bearing assembly along the interior surface of the hub.

In another embodiment, a centrifugal clutch assembly is configured to be mounted along a drive shaft of a motor where the drive shaft has an exterior surface and a shoulder at one end. The assembly includes a first spacer configured to fit about the exterior surface of the drive shaft and abut the shoulder of the drive shaft. The assembly includes an output hub with first and second ends. The hub has a sprocket associated with the second end. The hub further includes a ball bearing assembly disposed in an interior surface of the hub. The ball bearing assembly has an inner race configured to fit about the exterior surface of the drive shaft and abut the first spacer. The assembly includes a second spacer configured to fit about the exterior surface of the drive shaft and abut the inner race of the ball bearing assembly whereby the inner race is sandwiched between the first space and the second spacer. The assembly includes a centrifugal clutch with a drive hub configured to fit about the exterior surface of the drive shaft and abut the inner race of the ball bearing assembly. The assembly includes a third spacer configured to fit about the exterior surface of the drive shaft and abut the drive hub of the centrifugal clutch whereby the drive hub is sandwiched between the second and third spacers. The assembly also includes an attachment mechanism configured to secure the third spacer to a free end of the drive shaft. The attachment mechanism is adjustable to apply a compressive force to the third spacer, the drive hub, the second spacer, the inner race, and the first spacer so as to prevent movement of those components along the drive shaft. In one aspect of this embodiment, the sprocket has a sprocket plane and the ball bearing assembly has a bearing plane and the sprocket plane and the bearing plane are generally aligned with one another and each plane is configured to be generally perpendicular to a longitudinal axis of the drive shaft. In yet another aspect of this embodiment, the third spacer has a cap wall that is spaced apart from the free end of the drive shaft when the attachment mechanism is adjusted to apply the compressive force.

In another embodiment, a centrifugal clutch assembly is configured to be mounted along a drive shaft of a motor where the drive shaft has an exterior surface and a shoulder at one end. The assembly includes a bushing configured to fit about the exterior surface of the drive shaft and abut the shoulder of the drive shaft. The assembly includes an output hub with first and second ends. The hub has a sprocket associated with the second end. The second end is configured to fit about the bushing. The hub further includes a ball bearing assembly disposed in the first end. The ball bearing assembly has an inner race configured to fit about the exterior surface of the drive shaft and abut the bushing. The assembly includes a centrifugal clutch with a drive hub configured to fit about the exterior surface of the drive shaft and abut the inner race of the ball bearing assembly whereby the inner race is sandwiched between the bushing and the drive hub. The assembly includes a spacer configured to fit about the exterior surface of the drive shaft and abut the drive hub of the centrifugal clutch whereby the drive hub is sandwiched between the spacer and the inner race. The assembly also includes an attachment mechanism configured to secure the spacer to a free end of the drive shaft. The attachment mechanism is adjustable to apply a compressive force to the third spacer, the drive hub, the second spacer, the inner race, and the first spacer so as to prevent movement of those components along the drive shaft. In another aspect of this embodiment, the third spacer has a cap wall that is spaced apart from the free end of the drive shaft when the attachment mechanism is adjusted to apply the compressive force.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain the invention.

DETAILED DESCRIPTION OF THE INVENTION

Figure 1:
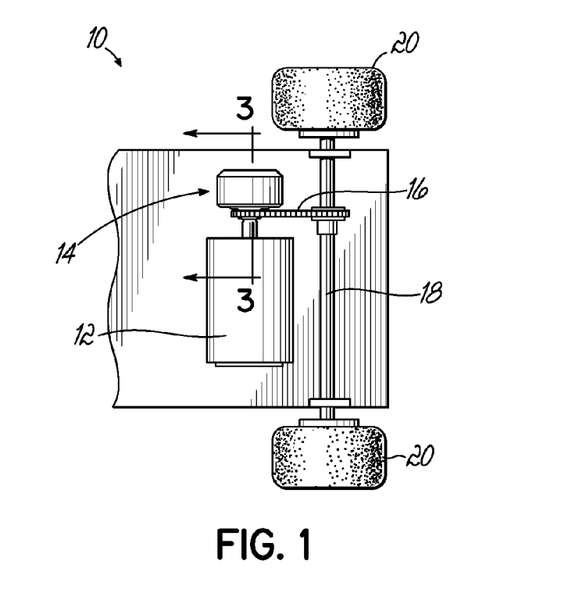
FIG. 1 is a bottom plan view of a vehicle including a first embodiment of a centrifugal clutch according to the principles of the invention.
Figure 2:
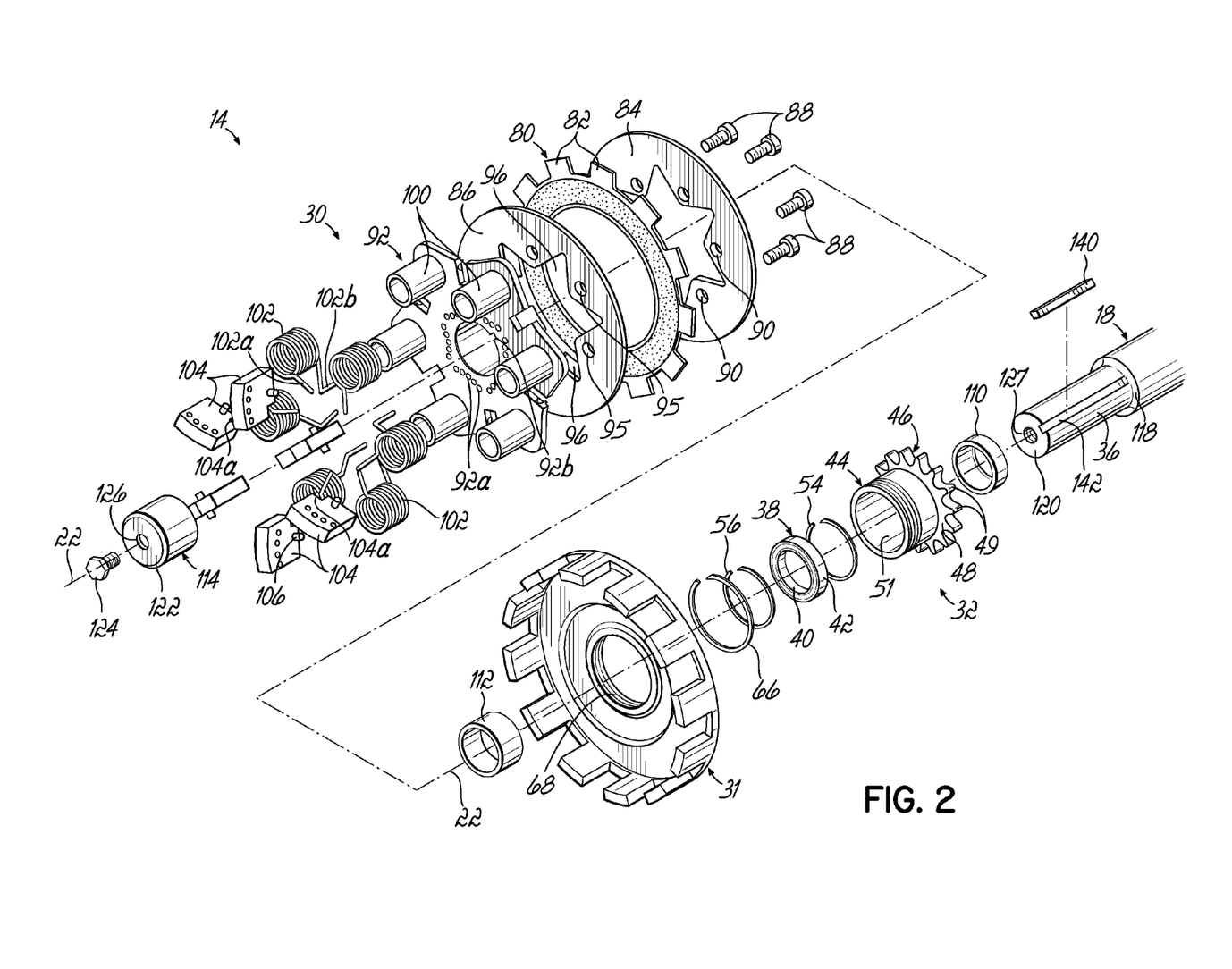
FIG. 2 is an exploded perspective view of the clutch of FIG. 1.

With respect to FIG. 1, a vehicle 10, such as a motorized kart, includes a motor 12, connected to a centrifugal clutch 14 of the present invention for transmitting rotation via a drive chain 16 to a drive shaft 18 for driving wheels 20. As shown in FIGS. 1 and 2, the centrifugal clutch 14 is positioned in-line with the drive shaft 18 and the motor 12 along a longitudinal axis 22. The following description refers to "distal" and "proximal" directions along the longitudinal axis 22 with respect to the exemplary position of the motor 12. Thus, "proximal" or "proximally positioned" refers to a direction toward the motor 12 along the drive shaft 18, while "distal" or "distally positioned" refers to a direction away from the motor 12 along the drive shaft 18. However, it will be appreciated that such directions are intended to describe relative locations along an exemplary embodiment of the invention described herein, and it is not intended that the terms "distal" or "proximal" limit the invention to any of the exemplary embodiments described herein.

Figure 3A:
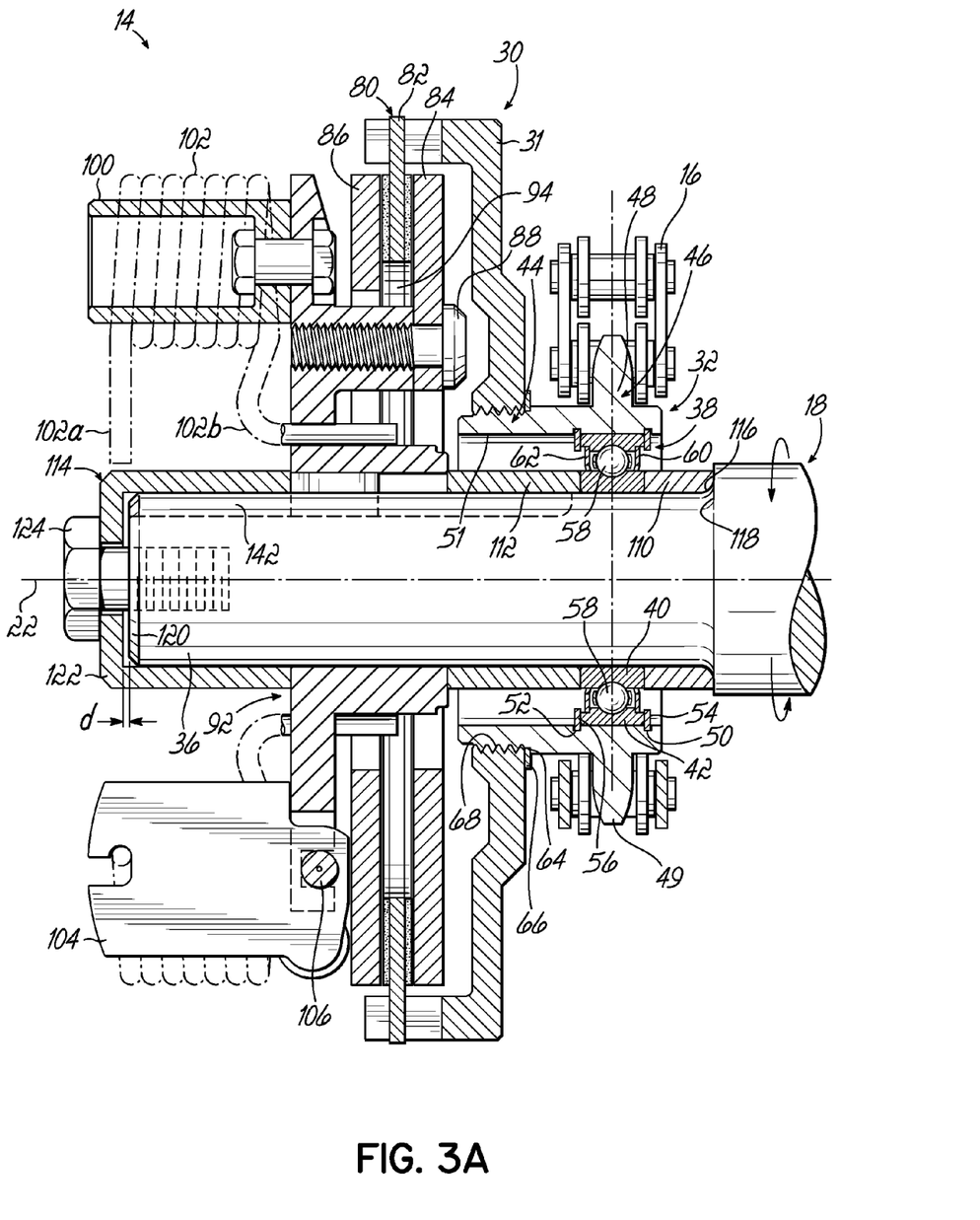
FIG. 3A is a cross-sectional view taken along line 3-3 of FIG. 1.
Figure 3B:
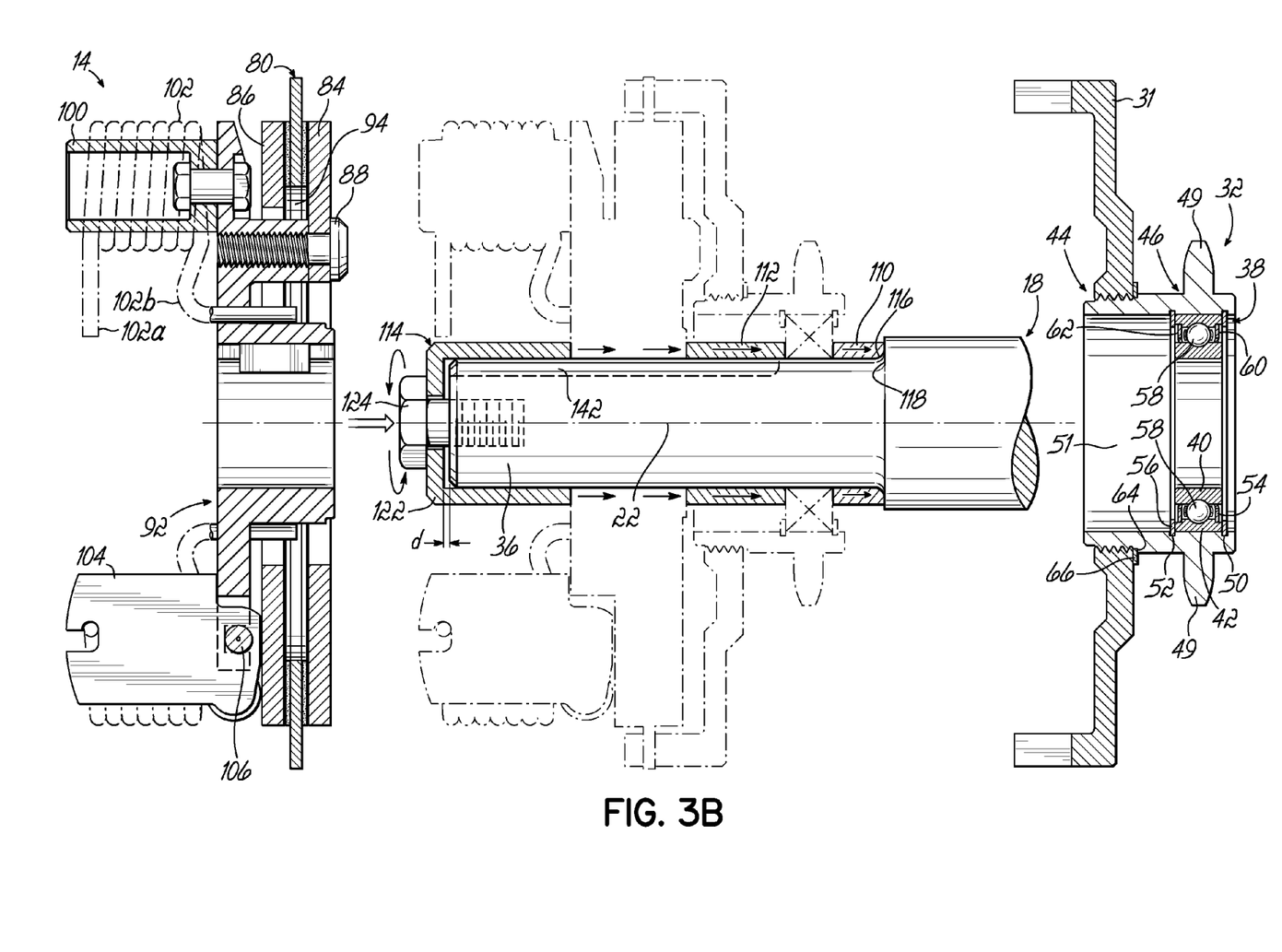
FIG. 3B is an exploded cross-sectional view of the clutch of FIG. 1.

FIGS. 2-3B show one embodiment of the centrifugal clutch 14 of the invention in more detail. The centrifugal clutch 14 comprises a drum assembly 30, having a drum housing 31, to which is attached an output hub 32 for accepting the chain 16 thereon as shown in FIG. 1. The drive shaft 18 includes a necked down portion 36 which distally extends into the centrifugal clutch 14. The centrifugal clutch 14 also includes a bearing 38 having an inner race 40 and an outer race 42. The inner race 40 is positioned on the necked down portion 36, while the outer race 42 supports the output hub 32. More particularly, a distal end portion 44 of the output hub 32 is connected to the drum housing 31 for transmitting force from the drum housing 31 to the output hub 32. In turn, a proximal portion 46 of the output hub 32 is configured for operatively coupling with the drive chain 16 for rotating the driving wheels 20 (see FIG. 1). More particularly, the proximal portion 46 includes a sprocket portion 48, which may also be referred to as a sprocket, having a plurality of chain teeth 49 for engaging the chain 16. According to an exemplary embodiment, the sprocket portion 48 includes eighteen radially extending chain teeth 49. The sprocket portion 48 may also include more or fewer chain teeth 49 than the eighteen shown in FIG. 2. The sprocket portion 48 is generally positioned within a sprocket plane perpendicular to that of a longitudinal axis 22 (FIG. 2) for proper alignment with the chain 16 connected thereto. However, it will be appreciated that the sprocket may be any rotatably driven element for transferring driving power to a transmission device, such as a chain, belt, or other mechanical component.

The outer race 42 of the bearing 38 is mounted against an interior surface 51 of the output hub 32. At the proximal portion 46 of the output hub 32, the interior surface 51 of the output hub 32 has a proximal inner diameter and includes proximal and distal shoulders 50, 52 for receiving proximal and distal bearing retaining rings 54, 56, respectively. The outer race 42 is positioned between the proximal and distal bearing retaining rings 54, 56 for peripherally sandwiching and securing the outer race 42 therebetween. According to an exemplary embodiment, the outer race 42 may additionally or alternatively be press fit against the interior surface 51. As such, the bearing 38 is disposed within the interior surface 51 and held between the proximal and distal retaining rings 54, 56 along the longitudinal axis 22.

According to an exemplary embodiment, the bearing 38 is a ball bearing assembly 38. Generally, ball bearings may be preferable for receiving axial and radial loading between the output hub 32 and the drive shaft 18 created by the chain 16 during use. The ball bearing assembly 38 includes a plurality of balls 58 radially positioned about the bearing 38 between the inner race 40 and the outer race 42. Additionally, the inner race 40 has an inner diameter sized to fit directly onto the necked down portion 36 of the drive shaft 18. More particularly, the inner diameter of the inner race 40 is approximately 0.75 inches and the diameter of the necked down portion 36 is also approximately 0.75. The ball bearing assembly 38 also includes proximal and distal faces 60, 62 for fixing the inner race 40 to the outer race 42 and the plurality of balls 58 therebetween. As such, the plurality of balls 58 lie along a bearing plane that is generally perpendicular to the longitudinal axis 22. More particularly, the bearing plane generally bisects the plurality of balls 58 and the inner and outer races 40, 42 about symmetrical proximal and distal faces 60, 62 positioned along the longitudinal axis 22. Furthermore, with respect to the first embodiment of the centrifugal clutch 14, the bearing plane generally aligns with the sprocket plane for reducing (and potentially eliminating) the moment arm between the sprocket portion 48 and the drive shaft 18 created by the chain 16. For example, the reduced moment arm will tend to reduce noise, lower power loss, and improve the useful life of the centrifugal clutch 14.

As discussed above, the distal end portion 44 of the output hub 32 is connected to the drum housing 31 for rotatably supporting the drum housing 31 about the necked down portion 36 of the drive shaft 18. In this respect, the distal end portion 44 of the output hub 32 is threaded and includes a hub shoulder 64 proximally adjacent to the threaded distal end portion 44. The distal end portion 44 also includes the interior surface 51 having a distal inner diameter. As such, the distal and proximal inner diameters of the output hub 32 are substantially the same. The hub shoulder 64 receives a hub retaining ring 66 for bracing against and stopping the drum housing 31. Specifically, the drum housing 31 includes a threaded opening 68 which receives threaded distal end portion 44 of the output hub 32. The threaded opening 68 receives threaded distal end portion 44 until the hub retaining ring 66 contacts the drum housing 31. According to an exemplary embodiment, the direction of the cooperating threads (left hand or right hand) of the threaded opening 68 and of the threaded distal end portion 44 may be selected for preventing the cooperating threads from loosening while being driven by the drive shaft 18. For example, according to an exemplary embodiment, the threaded distal end portion 44 and the threaded opening 68 include left-handed threads for accommodating the rotational direction of the drive shaft 18 as opposed to more common right-handed threads.

The drum assembly 30 further includes a clutch disk 80 having a plurality of tabs 82. The clutch disk 80 is interleaved between a pair of drive plates 84, 86. Screws 88 are inserted through a plurality of holes 90 of the drive plate 84 to secure the drive plate 84 to a drive hub 92. A plurality of spacers 94 fixedly space drive plate 84 away from the drive hub 92. The drive plate 86 is rotated relative to the drive plate 84 such that the screws 88 do not pass through a plurality of holes 95 of the drive plate 86 but through open areas 96. Consequently, the drive plate 86 rotates in unison with the drive plate 84 and the drive hub 92, but is able to axially translate relative to the drive plate 84 and the drive hub 92 along the spacers 94. It can be appreciated that additional clutch discs 80 may also be used in the drum assembly 30. For each additional clutch disc 80, an additional drive plate 86 is added with the additional clutch disc 80 interleaved therebetween. Additional clutch discs 80 may be required when a relatively large amount of torque is to be transmitted from the motor 12 to the wheels 20 shown in FIG. 1.

As further shown in FIGS. 2-3B, the drive hub 92 includes a plurality of attachment posts or spring towers 100 equally spaced about the drive hub 92. A plurality of torsion springs 102 are concentrically mounted on each spring tower 100. A plurality of weighted members or levers 104 are pivotally attached to drive hub 92 with dowel pins 106. The torsion springs 102 have first and second ends 102a, 102b. The first end 108 is placed within a slot 104a of the weighted member 104. The second end 102b is placed with one of a plurality of adjustment holes 92a in the drive hub 92. The second end 102b may be selectively placed in any of the adjustment holes 92a in order to alter the restoring force that the torsion spring 102 exerts on the weighted member 104. The drive hub 92 further includes a keyway 92b. The keyway 92b cooperates with a key 140 and shaft keyway 142 of the necked down portion 36 such that the drive hub 92 rotates in unison with the drive shaft 18.

Furthermore, a plurality of clutch spacers 110, 112, 114 are positioned about the drive shaft 18 for compressing portions of the centrifugal clutch 14 onto the drive shaft 18. More particularly, the necked down portion 36 is inserted into each of the clutch spacers 110, 112, 114 with enough clearance such that the clutch spacers 110, 112, 114 may generally slide along the longitudinal axis 22, but are otherwise generally restrained from movement during assembly. According to an exemplary embodiment, the plurality of clutch spacers includes a proximal clutch spacer 110, a medial clutch spacer 112, and a distal clutch spacer 114. The proximal clutch spacer 110 has a spacer chamfer 116 sized for cooperating with a drive shaft chamfer 118 in compression. Typically, the drive shaft chamfer 118 is selected for reducing stress concentrations caused by the transmission of force between the centrifugal clutch 14 and the motor 12 (see FIG. 1). However, in addition, the drive shaft chamfer 118 provides a rigid stop against which portions of the centrifugal clutch 14 may be held in compression. It will be appreciated that other surfaces may be provided for compressing portions of the centrifugal clutch 14 and, as such, the rigid stop is not intended to be limited to the drive shaft chamfer 118 of the exemplary embodiment.

The proximal clutch spacer 110 is sandwiched between the drive shaft chamfer 118 and the inner race 40. In turn, the medial clutch spacer 110 is sandwiched between the inner race 40 and the drive hub 92. The distal clutch spacer 114 is finally fastened to an end 120 of the drive shaft 18 for compressing the drive hub 92, the medial clutch spacer 112, the bearing 38, and the proximal clutch spacer 110 against the drive shaft chamfer 118. According to an exemplary embodiment, the distal clutch spacer 114 includes a cap wall 122 having a hole 126. The hole 126 receives a threaded fastener 124 for mounting the distal clutch spacer 114 in compression as shown in FIGS. 3A-3B (see the arrows in FIG. 3B). The threaded fastener 124 is received within a threaded hole 127 for tightening the threaded fastener 124 therein. Notably, a clearance gap d is maintained between the end 120 of the drive shaft 18 and the cap wall 122 for ensuring that the distal clutch spacer 114 maintains compression along the drive shaft 18. The positive application of compression of all the components along the drive shaft 18 minimizes wear and friction and maximizes the power delivered to the wheels 20. If there was no clearance gap d and the distal clutch spacer 114 were allowed to "bottom out" by contacting the cap wall 122 against the end 120 of the drive shaft 18, the compression along the distal, medial, and proximal spacers 114, 112, 110 may not be sufficiently maintained. Under those circumstances, all of the components mounted on the drive shaft 18 may be able to move back and forth along the drive shaft 18 causing additional wear and friction, thereby reducing the amount of power delivered to the wheels 20.

The operation (engagement and disengagement) of the centrifugal clutch 14 and, more particularly, the operation of the drum assembly 30 illustrated with respect to FIGS. 2-3B, is described in additional detail in U.S. Pat. No. 6,279,711, the disclosure of which is hereby incorporated by reference herein.

Figure 4A:
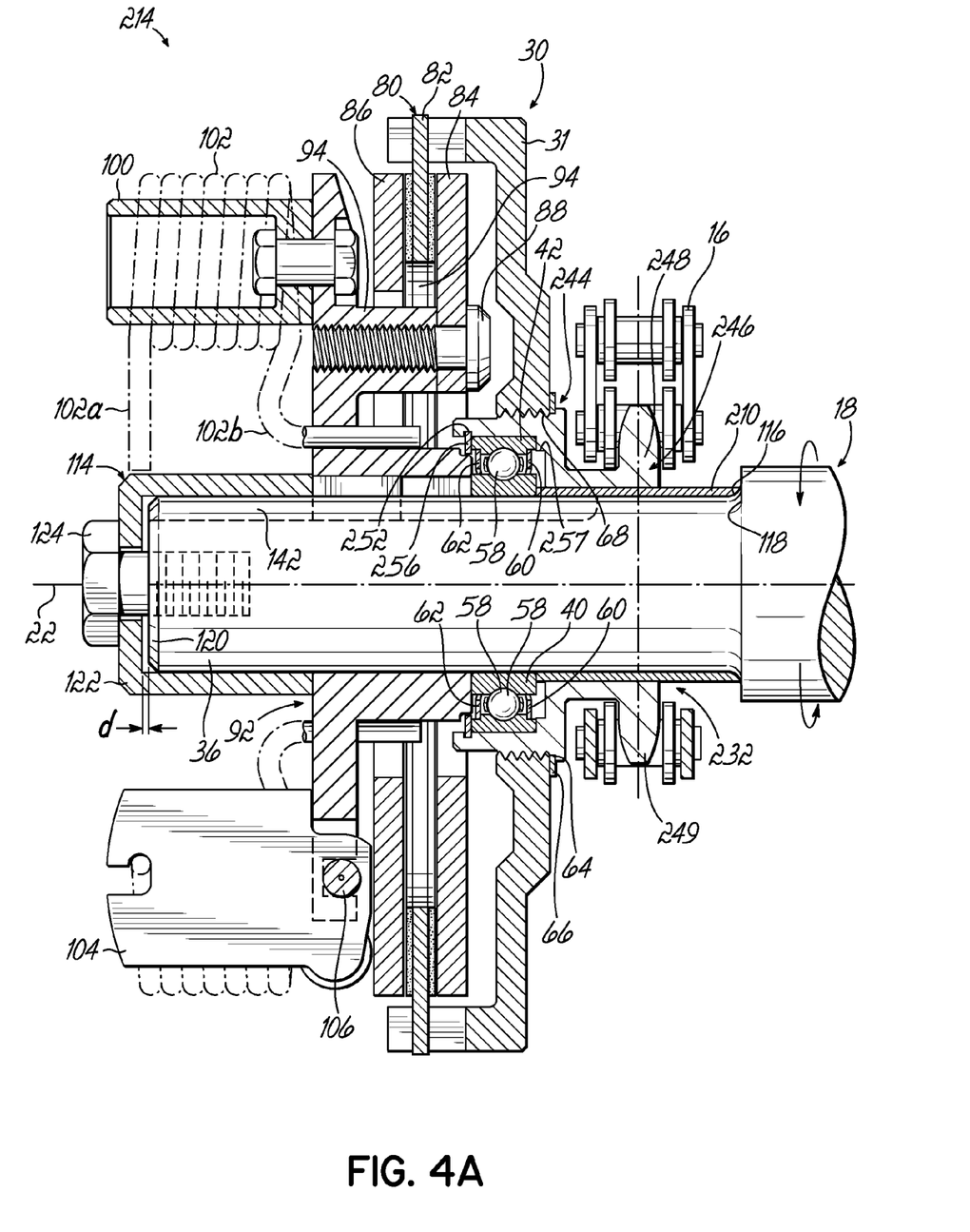
FIG. 4A is a cross-sectional view similar to FIG. 3A of a second embodiment of a centrifugal clutch according to the principles of the invention.
Figure 4B:
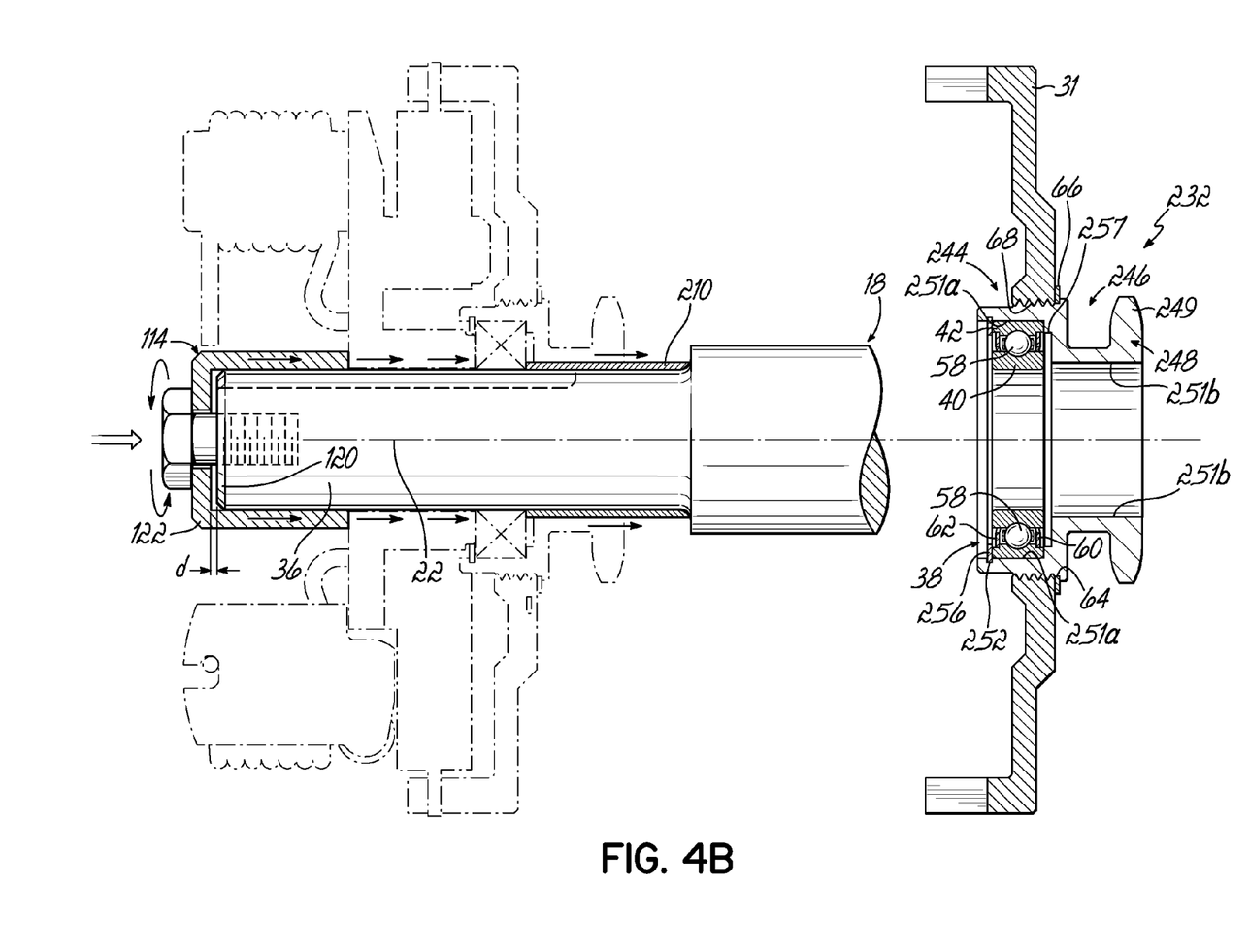
FIG. 4B is an exploded cross-section view of the clutch of FIG. 4A.

With respect to FIG. 4A-4B, another embodiment of a centrifugal clutch 214 may be operatively connected to the drive chain 16 and the drive shaft 18. In this respect, like numbers indicate like features previously described above. As such, an output hub 232 for accepting the chain 16 is similar to the output hub 32 discussed with respect to FIGS. 1-3B, except that the output hub 232 is generally smaller in diameter and having fewer teeth for providing an alternative power ratio from the motor 12 to the wheels 20. As shown in FIGS. 4A-4B, the centrifugal clutch 14 also includes the ball bearing assembly 38, as previously described above. The inner race 40 is positioned on the necked down portion 36, while the outer race 42 supports the output hub 232. More particularly, a distal end portion 244 of the output hub 232 is connected to the drum housing 31 for transmitting force from the drum housing 31 to the output hub 232. In turn, a proximal end portion 246 of the output hub 232 is configured for operatively coupling with the drive chain 16 for rotating the driving wheels 20 (see FIG. 1). More particularly, the proximal end portion 246 includes a sprocket portion 248, which may also be referred to as a sprocket, having a plurality of chain teeth 249 for engaging the chain 16. According an exemplary embodiment, the sprocket portion 248 includes seventeen radially extending chain teeth 249, which is one less than the number of chain teeth 49 of sprocket portion 48. The sprocket portion 248 is generally positioned within a reduced sprocket plane perpendicular to that of the longitudinal axis 22 for proper alignment with the chain 16 connected thereto. However, it will be appreciated that the sprocket may be any rotatably driven element for transferring driving power to a transmission device, such as a chain, belt, or other mechanical component.

Furthermore, a plurality of clutch spacers 210, 114 are positioned about the drive shaft 18 for compressing portions of the centrifugal clutch 14 onto the drive shaft 18. More particularly, the necked down portion 36 is inserted into each of the clutch spacers 210, 114 with enough clearance such that the clutch spacers 210, 114 may generally slide along the longitudinal axis 22, but are otherwise generally restrained from movement during assembly. According to an exemplary embodiment, the plurality of clutch spacers includes a proximal clutch spacer 210, and the distal clutch spacer 114. The proximal clutch spacer 110 has a spacer chamfer 116 sized for cooperating with a drive shaft chamfer 118 in compression as described above.

The proximal clutch spacer 210 is sandwiched between the drive shaft chamfer 118 and the inner race 40. In turn, the inner race 40 is sandwiched between the proximal clutch spacer 210 and the drive hub 92. The distal clutch spacer 114 is finally fastened to the end 120 of the drive shaft 18 for compressing the drive hub 92, the bearing 38, and the proximal clutch spacer 110 against the drive shaft chamfer 118 maintaining the clearance gap d, as described above. Again, the positive application of compression (see arrows in FIG. 4B) of all the components along the drive shaft 18 minimizes wear and friction and maximizes the power delivered to the wheels 20.

In the embodiment shown in FIGS. 4A and 4B, the bearing plane of bearing 38 is not aligned with the sprocket plane like the embodiment in FIG. 3A. Here, the outer race 42 of the bearing 38 is mounted against a distal interior surface 251a of the output hub 232. At the distal end portion 244 of the output hub 232, the distal interior surface 251a of the output hub 232 has a distal inner diameter and includes a distal shoulder 252 for receiving a distal bearing retaining ring 256, respectively. The output hub 232 also includes a proximal interior surface 251b having a proximal inner diameter. The distal inner diameter is larger than the proximal inner diameter and defines a lip 257. The outer race 42 is positioned between the distal bearing retaining ring 256 and the lip 257 for peripherally sandwiching and securing the outer race 42 therebetween. According to an exemplary embodiment, the outer race 42 may additionally, or alternatively, be press fit against the distal interior surface 251a. As such, the bearing 38 is disposed within the distal interior surface 251a and held between the distal bearing retaining ring 256 and the lip 257 along the longitudinal axis 22.

The proximal end portion 246 includes the relatively smaller proximal inner diameter in order to accommodate the reduced number of teeth 249, for example, the seventeen teeth 249. As such, the bearing plane is proximally offset from the reduced sprocket plane so that the vehicle 10 (see FIG. 1) may benefit from the alternative power ratio.

Accordingly, the vehicle 10 (see FIG. 1) may benefit from the alternative power ratio by sacrificing the reduced moment arm may be minimized in order to reduce noise, lower power loss, and improve the useful life of the centrifugal clutch 14.

Figure 5:
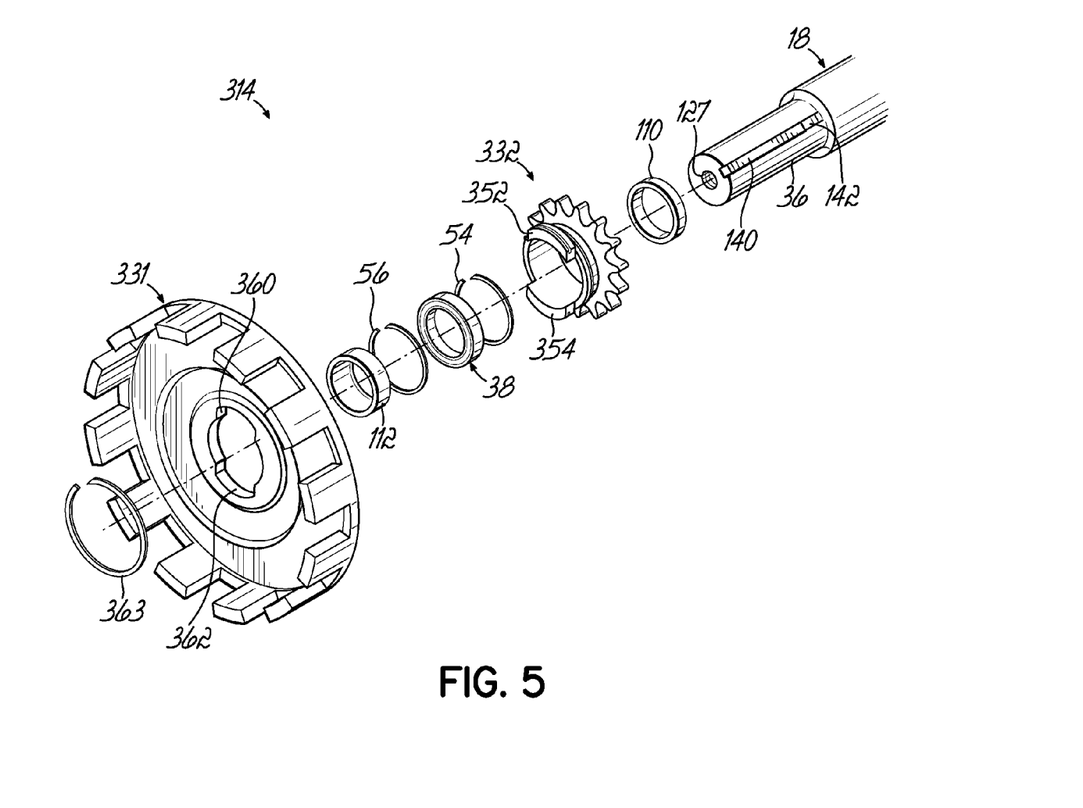
FIG. 5 is an exploded perspective view of a third embodiment of a centrifugal clutch according to the principles of the invention.

With respect to FIG. 5, a portion of yet another embodiment of a centrifugal clutch 314 includes an alternative output hub 332 and alternative drum housing 331. In this respect, like numbers indicate like features previously described above. Instead of having a threaded end, the output hub 332 includes a pair of peripheral members 352, 354, and the drum housing 331 includes a pair of slots 360, 362 instead of a threaded opening. The peripheral members 352, 354 are configured to pass through the slots 360, 362 where an additional retaining ring 363 couples the output hub 332 to the drum housing 331. As such, the coupling of the drum housing 331 to the output hub 332 is similar to the coupling shown in U.S. Pat. No. 6,279,711 incorporated by reference above. Furthermore, it will be appreciated that other structures and methods for coupling the output hub 332 to the drum housing 331 may be used in accordance with the invention described herein. In that regard, an output hub could be welded to a drum housing.

Figure 6:
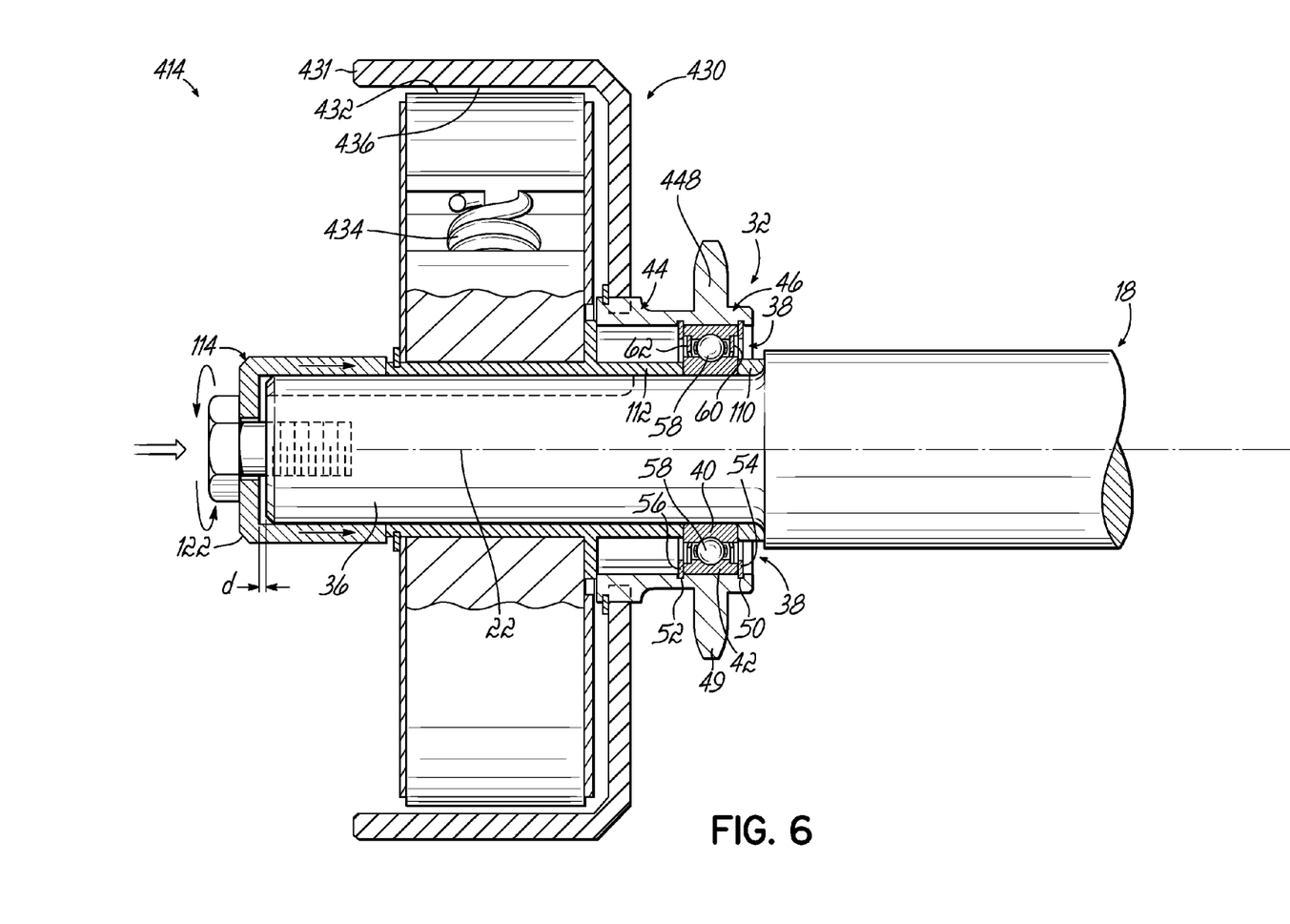
FIG. 6 is a sectional view similar to FIG. 3A of a fourth embodiment of a centrifugal clutch according to the principles of the invention.

FIG. 6 shows another embodiment of a centrifugal clutch 414 similar to the embodiment of the centrifugal clutch 14 described above in which like number indicate like features. The previously described clutches are classified as disc clutches. The embodiment in FIG. 6 is classified as a drum clutch. The centrifugal clutch 414 includes a drum assembly 430 having an alternative drum housing 431. For example, the drum assembly 430 includes an outer surface 432 within the drum housing 431 operable to expand during use via springs 434. The outer surface 432 expands into an inner clutch surface 436 of the drum housing 431. When the outer surface 432 frictionally engages the inner clutch surface 436, the motor 12 operatively drives the sprocket portion 448 for engaging the drive chain 16 and rotating the wheels 20, as shown in FIG. 1. Like the other embodiments described above, all of the components along the drive shaft 18 are compressed so as to eliminate any movement of those components along the drive shaft 18.

While the present invention has been illustrated by the description of specific embodiments thereof, and while these embodiments have been described in considerable detail, they are not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A centrifugal clutch assembly configured to be mounted along a drive shaft of a motor, the drive shaft having an exterior surface and a shoulder at one end, the assembly comprising:
   a first spacer configured to fit about the exterior surface of the drive shaft and abut the shoulder of the drive shaft;
   an output hub having first and second ends, the hub having a sprocket associated with the second end, the hub further includes a ball bearing assembly disposed in an interior surface of the hub, the ball bearing assembly having an inner race configured to fit about the exterior surface of the drive shaft and abut the first spacer;
   a second spacer configured to fit about the exterior surface of the drive shaft and abut the inner race of the ball bearing assembly whereby the inner race is sandwiched between the first spacer and the second spacer;
   a centrifugal clutch with a drive hub configured to fit about the exterior surface of the drive shaft and abut the second spacer;
   a third spacer configured to fit about the exterior surface of the drive shaft and abut the drive hub of the centrifugal clutch whereby the drive hub is sandwiched between the second and third spacers; and
   an attachment mechanism configured to secure the third spacer to a free end of the drive shaft;
   the attachment mechanism being adjustable to apply a compressive force to the third spacer, the drive hub, the second spacer, the inner race, and the first spacer so as to prevent the movement along the drive shaft.

2. The apparatus of claim 1, wherein the sprocket has a sprocket plane and the ball bearing assembly has a bearing plane, the sprocket plane and the bearing plane being generally aligned with one another and each plane configured to be generally perpendicular to a longitudinal axis of the drive shaft.

3. The apparatus of claim 1, wherein the third spacer has a cap wall, the cap wall being spaced apart from the free end of the drive shaft when the attachment mechanism is adjusted to apply the compressive force.

4. The apparatus of claim 1, wherein the first end of the output hub is a threaded first end, the centrifugal clutch further including a drum with a threaded opening, and the threaded first end engages the threaded opening of the drum.

5. A centrifugal clutch assembly is configured to be mounted along a drive shaft of a motor, the drive shaft having an exterior surface, first and second axial ends, and a shoulder at the first axial end, the assembly comprising:
   a bushing configured to fit about the exterior surface of the drive shaft and abut the shoulder of the drive shaft and encompass the first axial end;
   an output hub having first and second ends, the hub having a sprocket associated with the second end, the second end configured to fit about the bushing, the hub further including a ball bearing assembly disposed in the first end, the ball bearing assembly having an inner race configured to fit about the exterior surface of the drive shaft and abut the bushing;
   a centrifugal clutch with a drive hub configured to fit about the exterior surface of the drive shaft and abut the inner race of the ball bearing assembly, whereby the inner race is sandwiched between and in contact with the bushing and the drive hub;
   a spacer configured to fit about the exterior surface of the drive shaft and abut the drive hub of the centrifugal clutch whereby the drive hub is sandwiched between and in contact with the spacer and the inner race; and
   an attachment mechanism configured to secure the spacer to the second axial end of the drive shaft;
   the attachment mechanism being adjustable to apply a compressive force to the spacer, the drive hub, the inner race, and the bushing so as to prevent movement along the drive shaft.

6. The apparatus of claim 5, wherein the spacer has a cap wall, the cap wall being spaced apart from the free end of the drive shaft when the attachment mechanism is adjusted to apply the compressive force.

7. The apparatus of claim 5, wherein the first end of the output hub is a threaded first end, the centrifugal clutch further including a drum with a threaded opening, and the threaded first end engages the threaded opening of the drum.

* * * * *